Sept. 11, 1962  J. A. OLSON ET AL  3,053,510
RADIATOR SPLINE AND SUPPORT SYSTEM
Filed Feb. 20, 1959  3 Sheets-Sheet 1

INVENTORS
JOHN A. OLSON
JOHN A. McNAB, DECEASED
BY EDWARD C. WYNNE, ADMINISTRATOR
BY M. B. Tasker
ATTORNEY Sept. 11, 1962   J. A. OLSON ET AL   3,053,510
RADIATOR SPLINE AND SUPPORT SYSTEM
Filed Feb. 20, 1959   3 Sheets-Sheet 3

INVENTORS
JOHN A. OLSON
JOHN A. McNAB, DECEASED
BY EDWARD C. WYNNE, ADMINISTRATOR
BY M. B. Tasker
ATTORNEY

United States Patent Office 3,053,510
Patented Sept. 11, 1962

3,053,510
RADIATOR SPLINE AND SUPPORT SYSTEM
John A. Olson, West Hartford, Conn., and John A. McNab, deceased, late of Glastonbury, Conn., by Edward C. Wynne, administrator, Glastonbury, Conn., assignors to United Aircraft Corporation, East Hartford, Conn., a corporation of Delaware
Filed Feb. 20, 1959, Ser. No. 794,765
6 Claims. (Cl. 257—125)

This invention relates to nuclear powered turbine engines and radiators used therein, and is particularly concerned with improved means for mounting a radiator between the shaft connected compressor and turbine sections of such an engine.

The radiator may be a torous-shaped liquid-metal-to-air type, for example, in which annular tubular inlet and outlet headers form the outer cylindrical shell of the radiator and an annular tubular return header which surrounds the engine shaft forms the inner shell of the radiator. The headers may be connected by a cylindrical tube matrix through which liquid metal flows in the tubes between the headers and through which an axial crossflow of air discharged from the engine compressor is directed over the tubes.

It is an object of this invention to provide improved means for supporting such a radiator in the turbine engine casing.

Some of the more specific objects of the invention are to provide a radiator support capable of absorbing ram air loads on the radiator as well as rear thrust loads; to provide a proper orientation of the radiator about its axis relative to the engine casing and to suitably transmit all loads to the casing; to provide means for bypassing air between the engine casing and the radiator inner and outer shells for cooling the casing and also for preventing the bypass air fom shocking the hot inlet header of the radiator.

A further object of the invention is to provide a support of this type for a radiator by which the radiator and engine casing can be quickly connected and disconnected without the necessity for bolted flange connections at the radiator location.

A still further object of the invention is to provide a plurality of annular sets of splines on the radiator and casing which in the operating position of the radiator will intermesh or abut, as required, to support the radiator against fore and aft thrust loads and radial loads while providing for different rates of expansion and contraction of the hot and relatively cold radiator headers.

Another object of the invention is to provide a support for an annular radiator in the annular space between the cylindrical inner sleeve and the outer cylindrical casing which will permit a cooling flow of air between the radiator and said sleeve and casing supports.

A further object of the invention is generally to improve the construction and performance of nuclear powered gas turbine engines.

These and other objects and advantages of the invention will be evident or will be pointed out in connection with the following detailed description of one embodiment which the invention may assume in practice as shown in the accompanying drawings.

Figure 1:
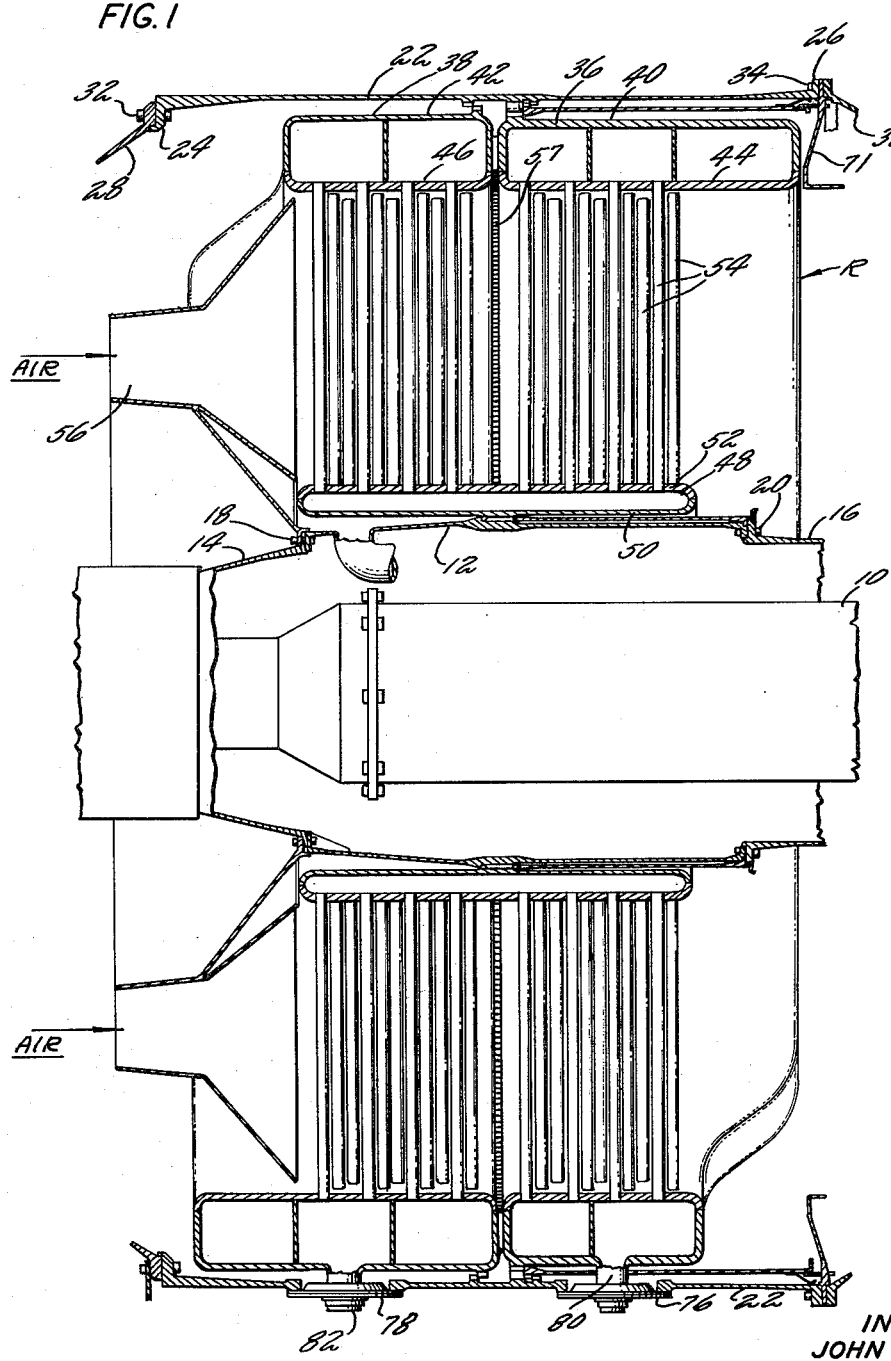
FIG. 1 is a longitudinal sectional elevation taken through the engine in the vicinity of the radiator.

As shown in FIG. 1, 10 indicates the axial shaft of the engine and 12 a concentric radiator supporting sleeve which surrounds shaft 10. The sleeve 12 is supported at its forward end by the inner diffuser casing 14 and at its aft end by an inner sleeve 16 of the turbine section, the usual bolted flanges being provided which are connected by an annular series of bolts 18 and 20. The outer engine casing 22, which is concentric with shaft 10 and its sleeve 12, is provided with flanges 24 and 26 and is connected at its forward end on an adjacent flanged section of the diffuser casing 28 and at its aft end on flanged turbine casing 30, bolts 32 and 34 being provided through the respective flanges.

A liquid-metal-to-air crossflow radiator generally represented by R is adapted to be located in the annular space between sleeve 12 and casing 22. This invention is primarily concerned with novel means on the radiator and on sleeve 12 and casing 22, by which the radiator is supported, so that it is capable of absorbing ram air loads and rear thrust loads and also to provide proper orientation of the radiator about its axis. Essentially, the radiator consists of an outer cylindrical shell which is formed by an aft tubular inlet header 36 and a forward tubular outlet header 38. These headers are somewhat flattened tubes, the outer cylindrical walls 40 and 42 of which form the outer shell of the radiator. The inner cylindrical walls 44 and 46 form the outer tube sheet of the radiator.

An intermediate return header 48 is provided concentric with sleeve 12, which is also formed as a flattened tubular member having an inner wall 50, which forms the inner shell of the radiator and an outer wall 52, which forms the inner tube sheet of the radiator.

The annular space between the inner and outer shells of the radiator is occupied by a tube matrix. The matrix consists of a plurality of curved, flattened tubes 54 which connect the confronting tube sheets 44, 46 and 52. It will be noted from FIG. 1 that these tubes 54 are arranged in banks which extend in the same circular plane around the headers with the tubes in the several banks arranged in staggered relationship.

Liquid metal is supplied to the inlet header 36 through an inlet elbow (not shown), flows through the tubes 54 connected with the inlet header into the intermediate header 48. The liquid metal then flows forward in the intermediate header, through the tubes 54 connected to the outlet header 38, and from the outlet header is discharged through an outlet elbow (not shown). This comprises the flow path for the liquid metal through the radiator. Air discharged from the engine compressor section enters the annular passage 56, defined by the diffuser casing, and flows axially aft through the radiator matrix where it flows over the tubes and then passes into the turbine section of the engine in a usual manner. The aft inlet header 36 and the forward outlet header 38 are provided at their adjacent surfaces with intermeshing radial face splines 57 which allow for relative expansion between these header members, yet provide, in effect, a unitary outer header structure. This radiator is described in detail and claimed in a copending application of John A. McNab, Serial No. 794,764, filed February 20, 1959. Reference is made to this application for a detailed description of the radiator.

In accordance with this invention, the radiator R is jointly supported by header 48 on sleeve 12 and by casing 22 and to this end has an annular set of splines 58 formed on the inner periphery of wall 50 of this intermediate header 48. These splines are shown most clearly in FIG. 2, meshing with a similar set of external splines 60 formed on sleeve 12. It will also be noted from an inspection of FIG. 2 that sleeve 12 has an annular thrust abutment 62 which engages the forward face of the set of splines 58 on the header 48 and thus determines the axial location of the radiator relative to sleeve 12. A thrust ring 64 provides by its annular end 66 an aft abutment for the rear face of the set of splines 58, the thrust abutment 62 and the abutment 66 thus holding the inner radiator header against both fore and aft movements. Ring 64 has an inturned flange on its aft end which is secured between the turbine casing and sleeve 12 by the bolts 20. The ring 64 not only serves as an abutment for the radiator splines 58, transmitting ram air loads from the radiator splines 58 to the ring 64, but this ring also serves as a bypass air control for air which enters annular passage 65 from the diffuser for cooling sleeve 12.

Figure 2:
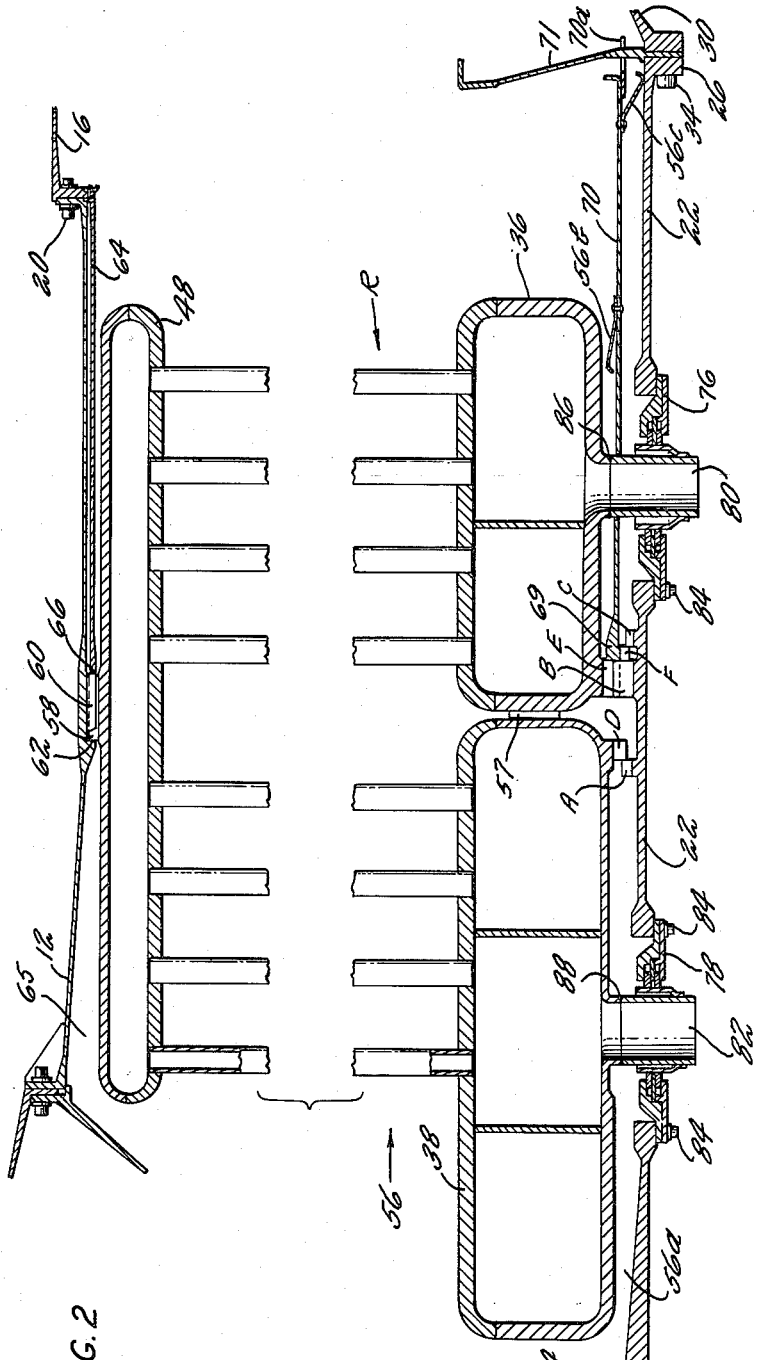
FIG. 2 is a similar view on an enlarged scale of the lower part of FIG. 1, certain parts having been broken away or omitted for purposes of illustration.

The outer shell of the radiator is supported on casing 22 by a plurality of sets of annular splines, three of which are carried by the engine casing 22 and two of which are carried by the radiator. Referring to FIG. 2, it will be noted that the casing 22 has a forward set of annular splines A, an intermediate set of annular splines B, and an aft set of annular splines C, all of which are internal splines. These splines are not all of the same dimension and they are not all of the same diameter. Thus, the annular series of splines B have the smallest inside diameter, the annular splines A have a somewhat larger internal diameter, and the splines C have the largest internal diameter. Also, the splines of set B are heavier and deeper than the splines of sets A and C.

These casing splines cooperate with two sets of external annular header splines D and E carried by the radiator outlet and inlet headers respectively. Of these, the splines D abut the casing splines A when the radiator is in operating position in the engine, as will be hereinafter explained, and the splines E, which are heavier splines, intermesh with the splines B on the casing to provide a proper orientation of the radiator about its axis relative to the casing. An adidtional set of splines F are provided on the forward end of a thrust ring 70. Splines F abut the forward faces of splines C on casing 22 in the operating position of the radiator, as will be hereinafter explained, while they also abut the aft faces of splines B on the casing 22, thus axially locating ring 70. The aft end of ring 70 carries a series of peripheral U-shaped members and is held against rotation by radial members 71 clamped between flange 26 and turbine casing 30, which extend between the arms 70a of the U-shaped members. Ring 70 also carries an annular inwardly directed abutment 69 on its forward end which abuts the aft face of splines E on the radiator. Ring 70, in addition to providing the abutting splines F which locate the ring axially, also provides a bypass control for the air which enters from the diffuser passage 56 and enters annular passage 56a surrounding the radiator outer shell.

This flow of air is provided to cool the casing 22. The sets of splines A and D which abut in the operative position of the radiator (FIG. 9) allow this cooling air flow to pass through the interspline spaces. It then flows through the roots of splines E and B and continues on both sides of thrust ring 70, the amount of air flowing over the hot header 36 being limited by an annular baffle 56b. A plurality of spring fingers 56c center the aft end of thrust ring 70 and allow the bypass air to flow out of the annular space between casing 22 and ring 70. Ring 70 thus serves the additional function of preventing the bypass air from shocking the hot inlet header 36.

As shown most clearly in FIGS. 1 and 2, the casing 22 is provided with two annular access plates 76 and 78 at the bottom of the radiator through which radiator drain pipes 80 and 82 project, suitable air seals being provided between the plates and the drain pipes. The covers are removably secured in place on the casing by cap screws 84. The openings in the casing through which the drain pipes extend are ample to permit a workman to weld the drain pipes to the outer cylindrical header walls 40 and 42, these welds being indicated in FIG. 2 by the numerals 86 and 88. It will be understood that the casing 22 is slid axially over the radiator into operative position before the drain pipes are welded to the headers.

The inlet and outlet elbows to the headers 36 and 38, which were mentioned above but not shown in the drawing, are similarly welded to the headers after the casing 22 is in position about the radiator, suitable large removable cover plates being provided in the casing 22 through which the elbows extend.

In assembling the structure above-described, it will be assumed that the radiator, minus the drain pipes 80 and 82 and minus the inlet and outlet elbows, has been assembled on the inner sleeve 12 with the thrust ring 64 in place, so the radiator cannot move axially on the sleeve. With the radiator thus axially fixed, the casing 22 is moved axially aft relative to the radiator to engage the engine casing splines A, B, C, with the radiator splines D and E, certain indexing movements being required during this operation.

Reference is now made to FIGS. 3 through 9. It will be noted that the three sets of splines A, B, and C on the engine casing 22 are all indexed to lie in the same radial planes. In other words, they are in line forward to aft. The sets of splines D and E on the radiator R, however, are out of line with each other by one tooth. In other words, they are not in line forward to aft, but on the contrary, the splines D are in line with the spaces between the splines E. Bearing this in mind, and also recalling that the splines C have a greater inside diameter than the set of splines E, the steps of moving the engine case 22 aft over the radiator will now be described.

Figure 3:
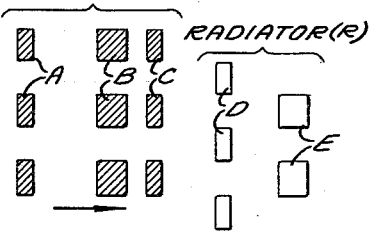
FIGS. 3 through 9 are diagrammatic views showing in sequence the steps for effecting the relative movement of the engine casing and the radiator in mounting the radiator in the engine casing, it being understood that only a sampling of the splines in each of the annular series of splines is shown in these figures.
Figure 4:
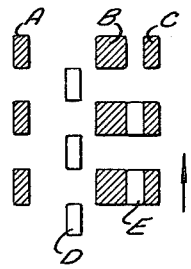
Figure 5:
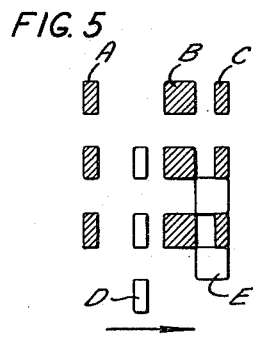
Figure 6:
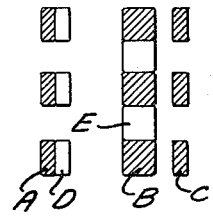
Figure 7:
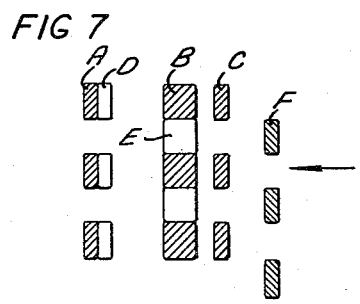
Figure 8:
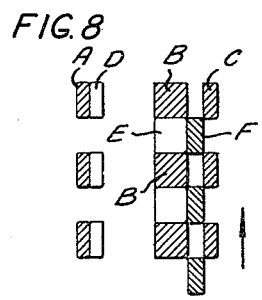
Figure 9:
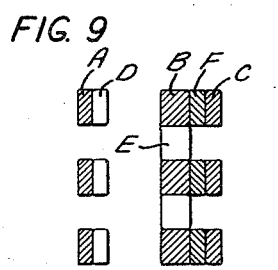

In FIG. 3, the radiator R, which is to remain axially fixed, has its sets of splines D and E shown without crosshatching to distinguish from the sets of splines A, B and C on the engine casing 22, which are crosshatched. This distinction is carried throughout the FIGS. 3 through 9, inclusive. As indicated by the arrow in FIG. 3, the engine casing 22 is moved aft relative to the radiator R, with its sets of splines in position to pass through the spaces between the splines D on the radiator. This movement can continue until the splines B abut the splines E, the splines C being able to pass over the splines E because of their greater internal diameter. The engine casing 22 is now rotated counterclockwise (looking aft), without forward or aft movement of the casing, a distance of one tooth space, which will bring splines D on the radiator in fore and aft alignment with the splines A on the engine casing, while splines B on the engine casing will be in alignment with the interspline spaces of splines E, as shown in FIG. 5. The engine casing 22 is now moved aft until the set of splines A on the engine casing engage the set of splines D on the radiator, which will bring the sets of splines E on the radiator and B on the casing into mesh, as shown in FIG. 6. The spline ring 70 carrying the set of splines F is now moved forward, as shown in FIG. 7, until the splines F are in the position shown in FIG. 8. The ring 70 is then rotated in the direction of the arrow in FIG. 8, the width of one tooth, which brings the set of splines F into abutting engagement with both sets of splines B and C on the engine casing 22 (FIG. 9). It will now be evident that the forward splines D on the radiator abut the forward splines A on the engine casing, thus preventing forward axial movement of the radiator. Also, the splines E of the radiator intermesh with the splines B of the casing 22 to support the radiator at its outer shell while the inner shell is supported by intermeshing splines 58 and 60. Aft movement of the radiator is prevented by thrust ring 64, the forward end 66 of which engages splines 58 on the radiator and by the engagement of abutment 69 with radiator splines E.

From the above-described structure and operation of assembling the casing relative to the radiator, it will be evident that means have been provided for supporting the radiator in the annular space between sleeve 12 and casing 22, so that all loads ,both fore and aft, and radial, which may be exerted on the radiator or by the radiator, are transmitted to the engine casing structure. At the same time, the radiator is properly oriented about its axis. Also, the radiator is free to expand radially relative to its supporting structure by reason of the intermeshing splines B and E and splines 58 and 60.

It will further be noted that the splined supports for the radiator are not only effective in the normal flight position of the engine but are equally effective in any angular position of the engine about its longitudinal axis, for example, in bank and roll maneuvers.

Further, the radiator tubes are not required to absorb thrust loads, other than ram air loads, as other thrust loads are absorbed by the inner and outer header spline arrangement.

It will further be evident that improved bypass means for the air has been provided for cooling the casing while controlling the bypass air which engages the hot inlet header 36 or the hot end of intermediate header 48.

While only one embodiment of the invention has been shown and described herein, it will be understood that numerous changes may be made in the construction and arrangement of the several parts within the scope of the invention.

What is claimed is:

1. In combination, a cylindrical engine casing, a concentric inner sleeve, a radiator between said casing and sleeve having inner and outer shells and a tube matrix between said shells, and means for supporting said radiator on said sleeve and casing including sets of intermeshing splines on said sleeve and the inner shell of said radiator and on said casing and said outer shell, said supporting means also including an annular abutment on said sleeve for engaging the forward face of said splines on said inner shell, and a thrust ring fixed to said sleeve and projecting forward into engagement with the aft face of said splines on said inner shell.

2. In combination, a cylindrical engine casing, a concentric inner sleeve, a radiator between said casing and sleeve having inner and outer shells and a tube matrix between said shells, and means for supporting said radiator on said sleeve and casing including sets of intermeshing splines on said sleeve and the inner shell of said radiator and on said casing and said outer shell, means for supporting said radiator against forward movements relative to said casing including annular abutment means on said casing and on said radiator, and a thrust ring between said radiator and said casing aft of said supporting means having annular abutment means engaging the aft face of said supporting splines on said radiator, an annular set of internal splines on said casing spaced aft from said supporting splines on said radiator, said ring having an annular set of external splines engageable between said supporting splines on said casing and said internal splines, the aft end of said ring and said casing having interengaging members for permitting relative axial movement between said ring and said casing which holds said ring against rotation relative to said casing.

3. In combination, an outer cylindrical engine casing, an inner concentric sleeve, a radiator between said casing and sleeve having inner and outer cylindrical shells and a tube matrix between said shells, and means for supporting said radiator including three sets of annular splines on said casing spaced apart in a fore and aft direction, two sets of annular splines on said radiator spaced apart in a fore and aft direction, said sets of splines on said casing being aligned fore and aft and the sets of splines on said radiator being staggered relative to each other in the fore and aft direction, one set of splines on said casing abutting one set of splines on said radiator when the latter is in operating position in said casing to lock said radiator against forward movement relative to said casing, while another set of splines on said casing and the other set of splines on said radiator mesh to lock said radiator against axial rotation relative to said casing, and a thrust ring carried by said casing having a set of external splines adapted to cooperate with axially spaced sets of splines on said casing for preventing axial movement of said ring, said ring also having an annular abutment cooperating with one of said sets of splines on said radiator for preventing aft movement of the latter.

4. In combination, a cylindrical engine casing, a concentric inner sleeve, a radiator between said casing and sleeve having aft and forward annular inlet and outlet headers forming the outer shell of the radiator, an inner return header surrounding said sleeve and forming the inner shell of said radiator, and a tube matrix connecting said inlet and outlet headers with said return header, means for supporting said radiator in the annular space between said casing and sleeve including annular sets of external and internal intermeshing splines on said inner sleeve and on the adjacent annular surface of said inner return header and intermeshing annular sets of external and a plurality of cooperating internal splines on said radiator outer shell and on said casing, abutment means fixed to said casing and sleeve for holding said radiator against fore and aft movements, including annular thrust rings located between said inner header and said sleeve and between said outer casing and said radiator, and means for circulating cooling air between said thrust rings and the adjacent surfaces of said radiator for cooling said sleeve and casing.

5. In combination, a cylindrical engine casing, a concentric inner sleeve, said casing having three sets of adjacent annular splines, said sleeve having one set of annular splines, and a radiator supported on said sleeve and casing, said radiator having inner and outer cylindrical shells, said inner shell having an internal set of annular splines meshing with the splines on said sleeve, said sleeve having an abutment adjacent its splines engageable with the forward faces of said splines on said inner shell, an annular fixed ring having its forward edge abutting said splines on said inner shell and having its aft end fixed to said inner sleeve, the outer shell of said radiator having two sets of annular splines, one of which meshes with one of the three sets of splines on said casing, and another of which registers with and has the forward faces of its splines abutting the aft faces of another of said sets of splines on said casing, a thrust ring having a set of splines on its forward end which is movable into axial registry with and between two sets of splines on said casing, and means fixed to said casing for securing said thrust ring against rotation.

6. In combination, an outer cylindrical engine casing, an inner concentric sleeve, a radiator between said casing and sleeve having two annular inlet and outlet headers forming the outer radiator shell, said headers being arranged in fore and aft alignment, an annular intermediate return header forming the inner radiator shell, said return header being axially coextensive with said inlet and outlet headers, a tube matrix between said inner and outer shells, and means for supporting said radiator between said sleeve and casing including sets of annular splines carried by said casing, said radiator and said sleeve, said casing having three annular sets of internal splines the teeth of which are axially aligned with each other, said radiator having two annular sets of external splines the teeth of which are axially staggered, said forward set of splines on said radiator adapted to pass between the two aft sets of splines on said casing and abut the forward set of splines on said casing, the aftmost set of splines on said casing having an internal diameter sufficient to allow them to pass over the aft sets of splines on said radiator and subsequently to mesh with the other sets of splines on said radiator, and a thrust ring which is held against rotation relative to said casing having a set of external splines which are engageable between the two aft sets of splines on said casing in axial alignment therewith, said thrust ring also having an annular abutment at its forward end engageable with the aft face of the aft set of splines on said radiator.

References Cited in the file of this patent

UNITED STATES PATENTS

| | | |
|---|---|---|
| 2,479,071 | Henstridge | Aug. 16, 1949 |
| 2,547,619 | Buckland | Apr. 3, 1951 |
| 2,828,608 | Cowlin et al. | Apr. 1, 1958 |
| 2,836,959 | McDowall et al. | June 3, 1958 |
| 2,858,673 | Wirt | Nov. 4, 1958 |

FOREIGN PATENTS

| | | |
|---|---|---|
| 805,545 | Great Britain | Dec. 10, 1958 |